United States Patent [19]

Patel et al.

[11] 4,191,539
[45] Mar. 4, 1980

[54] METHOD FOR FEEDING CAKING COAL PARTICLES TO A GASIFIER

[75] Inventors: Jitendra G. Patel, Bolingbrook; Frank C. Schora, Palatine; John W. Loeding, Naperville, all of Ill.

[73] Assignee: Institute of Gas Technology, Chicago, Ill.

[21] Appl. No.: 824,352

[22] Filed: Aug. 15, 1977

Related U.S. Application Data

[63] Continuation-in-part of Ser. No. 693,352, Jun. 7, 1976, abandoned.

[51] Int. Cl.² .............................................. C10J 3/54
[52] U.S. Cl. .................................... 48/210; 48/203; 48/206
[58] Field of Search ............... 48/197 R, 202, 203, 48/206, 210, DIG. 4, 77, 86 R; 201/9, 31, 38

[56] References Cited

U.S. PATENT DOCUMENTS

| 2,577,632 | 12/1951 | Roetheli | 48/203 |
| 2,652,619 | 9/1953 | Sweetser et al. | 48/206 |
| 2,676,908 | 4/1954 | Noel | 48/DIG. 4 |
| 2,704,704 | 3/1955 | Ogorzaly | 48/206 |
| 2,906,608 | 9/1959 | Jequier et al. | 48/206 |
| 3,927,996 | 12/1975 | Knudsen et al. | 48/206 |
| 3,935,825 | 2/1976 | Matthews et al. | 48/206 |

Primary Examiner—S. Leon Bashore
Assistant Examiner—Peter F. Kratz
Attorney, Agent, or Firm—Allegretti, Newitt, Witcoff & McAndrews

[57] ABSTRACT

An improved method for feeding caking coal particles to a fluidized bed gasifier, without prior pretreatment, is disclosed. The coal particles are entrained in a gaseous stream and injected directly into the bottom of the fluidized bed around the outer perimeter thereof at a plurality of points and at a predetermined high velocity, such that the coal particles are shock heated and charred.

3 Claims, 4 Drawing Figures

METHOD FOR FEEDING CAKING COAL PARTICLES TO A GASIFIER

CROSS REFERENCE TO RELATED APPLICATION

This application is a continuation in part of my copending application, Ser. No. 693,352, filed June 7, 1976, now abandoned the teachings of which are incorporated by reference herein.

BACKGROUND OF THE INVENTION

The present invention relates generally to an apparatus and method for converting carbonaceous particles into a fuel gas. More particularly, the present invention relates to an improved coal conversion apparatus and method whereby prior pretreatment of the coal in a separate processing zone is substantially avoided.

In the gasification of coal, it is well known that certain coals, particularly bituminous coal, become plastic and sticky under certain temperature conditions. In this plastic state, the coal particles can cake or agglomerate. This caking or agglomeration interferes with gasification and consequently must be substantially reduced or eliminated for an efficient gasification process.

Various methods to reduce agglomeration are known. As disclosed in U.S. Pat. No. 2,805,189, the coal particles can be mildly oxidized with a gas containing oxygen, such as air. This method has the disadvantages of generating large amounts of heat that are difficult to recover and converting a portion of the carbon value of the coal to carbon dioxide. In addition, the gaseous byproducts of the pretreatment step contain valuable hydrocarbon liquids which are lost, unless separately treated, from the product gases. This, however, substantially increases the capital expenditure for the gasifier unit.

Another method of pretreating coal is illustrated in U.S. Pat. No. 2,582,712. A single volume of raw pulverized feed coal is admixed with 15 to 30 volumes of hot circulating residue recovered from the gasification reaction. This rapidly preheats the coal to gasification temperatures and, therefore, substantially avoids coal agglomeration. However, the circulation of high volumes of abrasive solid particulate matter has the obvious disadvantages of equipment wear and expense.

A method of introducing coal directly into a fluidized bed is illustrated in U.S. Pat. No. 3,927,996. In this method, coal is entrained in a carrier gas and, injected at a superficial gas velocity of 15–1,000 ft. per second at an acute angle down into the upper or cooler portion of the fluid bed. The velocity of the carrier gas is adjusted in response to the amount of fines carried overhead to control fines loss. This adjustment of carrier gas velocity and the preferred introduction of the coal into the upper portion of the bed at a high velocity are not conducive to the efficient conversion of coal to a fuel gas and the maintenance of a stable fluidized bed in the reactor.

Finally, there is illustrated in U.S. Pat. No. 2,577,632 a method for introducing coal particles into a fluidized bed from a single injection point directly into the center of a fluidized bed at a slow velocity. This method of introduction does not include high velocity injection and, as a result, increases the tendency for the coal to agglomerate in the fluidized bed.

SUMMARY OF THE INVENTION

The present invention provides an improved apparatus and method for feeding carbonaceous particles, such as coal, to a fluidized bed gasifier, particularly a single stage fluid bed gasifier maintained in an elongated reactor for the conversion of the material, i.e. coal to a fuel gas. Specifically, the present invention substantially eliminates the necessity of pretreatment of the carbonaceous particles prior to the introduction of the carbonaceous particles into the fluidized bed, to avoid agglomeration therein.

The carbonaceous particles are admixed with a gaseous stream, preferably containing steam and oxygen, to form a gas particulate mixture. The particulate mixture is then injected directly into the bottom portion of the fluidized bed of the gasifier, operating at gasification conditions, at a predetermined high velocity, and at a particular location such that the carbonaceous particles are shock heated to a temperature sufficient to render the carbonaceous particles non-caking within the bed. This effectively "pretreats" the coal particles and obviates the need for a separate or external pretreatment zone. Specifically, the present invention requires the ash etc. to be withdrawn from the bottom center section of the fluidized bed and for the fresh feed coal to be introduced at a plurality of points into the bottom of the fluidized bed near the reactor wall and substantially away from the ash withdrawal point. More particularly, the fresh feed coal is introduced either directly upward into the bed in a direction substantially parallel to the axis of the reactor or tangentially to the reactor wall and in a plane normal to the axis of the reactor. Either of these methods of introduction rapidly and effectively shock heats the coal while maintaining a stable fluidized bed having a relatively uniform residence time distribution therein.

It is thus an object of the present invention to provide an improved apparatus and method for feeding carbonaceous particles to a fluidized bed gasifier.

It is also an object of the present invention to provide an improved coal feed apparatus and method whereby pretreatment of the coal is substantially avoided.

These and other objects, features and advantages of the present invention are apparent from the following description of a preferred embodiment.

BRIEF DESCRIPTION OF THE DRAWINGS

A preferred embodiment of the present invention will be described in detail with reference to the attached drawings.

DESCRIPTION OF THE PREFERRED EMBODIMENT

Figure 1:
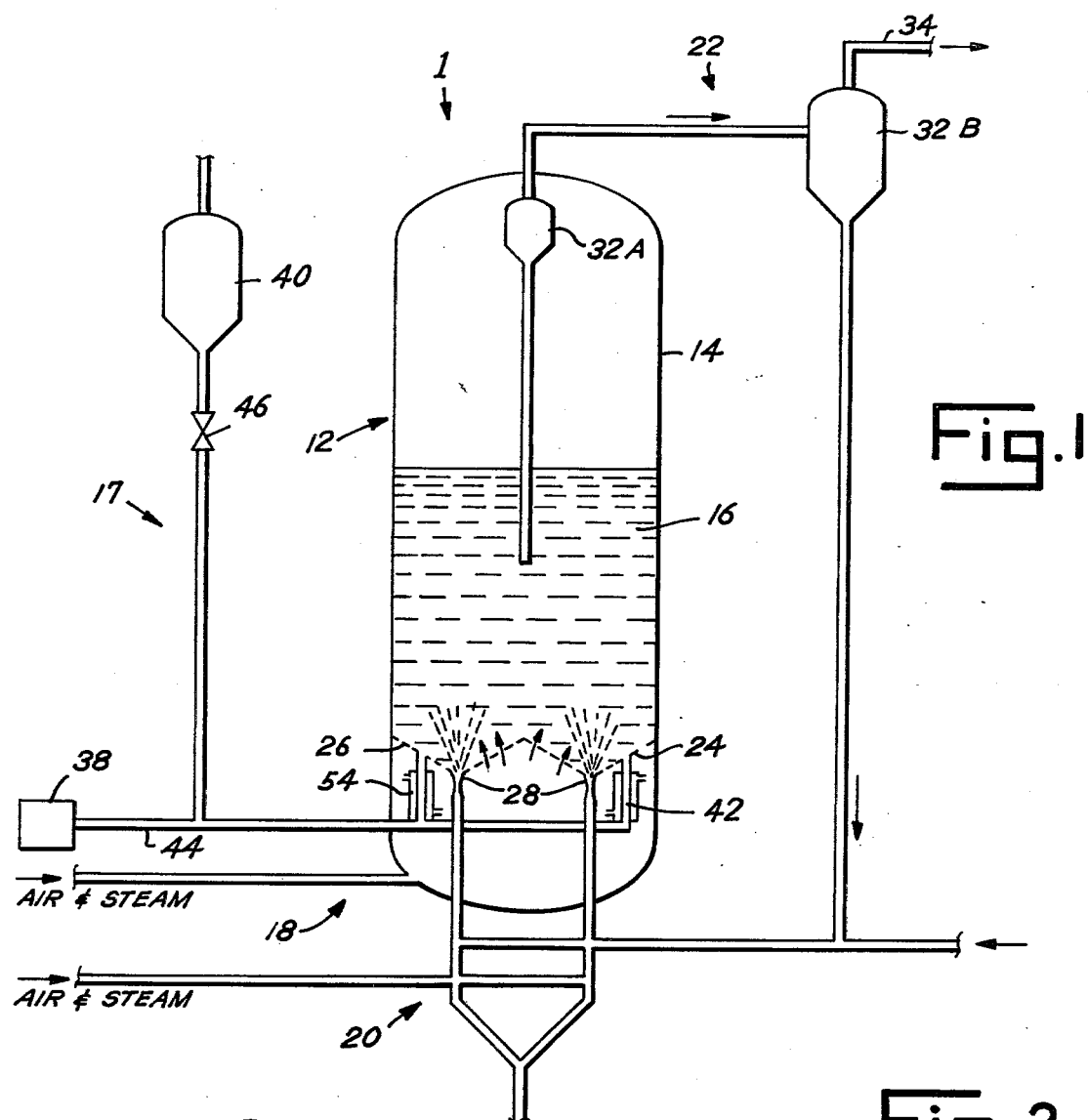
FIG. 1 is a schematic diagram of a fluidized bed gasification system incorporating a preferred embodiment of the present invention.

Referring to FIG. 1, an apparatus 1 for the conversion of caking coal particles in a single stage into a fuel gas is schematically illustrated. The apparatus 1 includes an elongated gasification reactor 12 having a vertical reactor wall 14 and a fluidized bed 16 of coal particles in the lower portion thereof. The bulk of the fluidized bed 16 is non-caking, charred material.

The apparatus 1 also includes as a preferred embodiment of the present invention, a coal feed system 17, a gas injection system 18, an ash withdrawal system 20 and a fuel gas withdrawal system 22. The coal feed system 17 delivers freshly crushed coal particles to the reactor 12 which is maintained under predetermined conventional gasification conditions. The coal particles are gasified within reactor 12 to produce gas which evolves from the fluidized bed 16 into the upper, free portion of the gasification reactor 12.

The gasification reactor 12 preferably operates at a pressure of about 50 to 400 pounds per square inch (psi) and a fluidized bed temperature of about 1800° to 2000° F. A preferred specific pressure and temperature are 350 psi and 1900° F. The fuel gas produced therein has a heating value of about 100 to 300 Btu per cubic foot.

Figure 2:
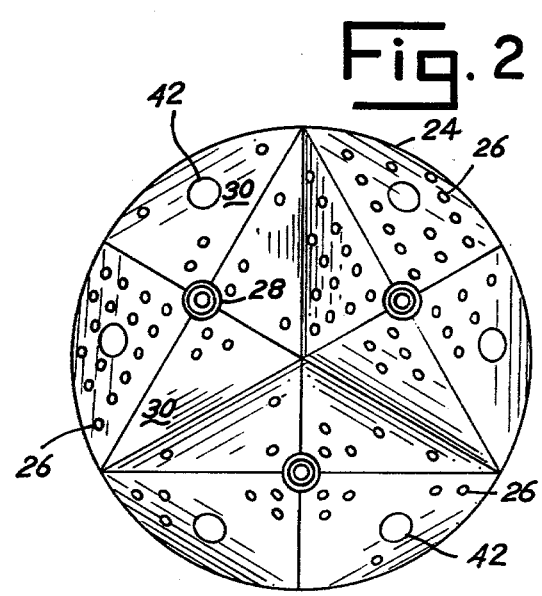
FIG. 2 is a top view of the gas distribution grid shown in FIG. 1.
Figure 3:
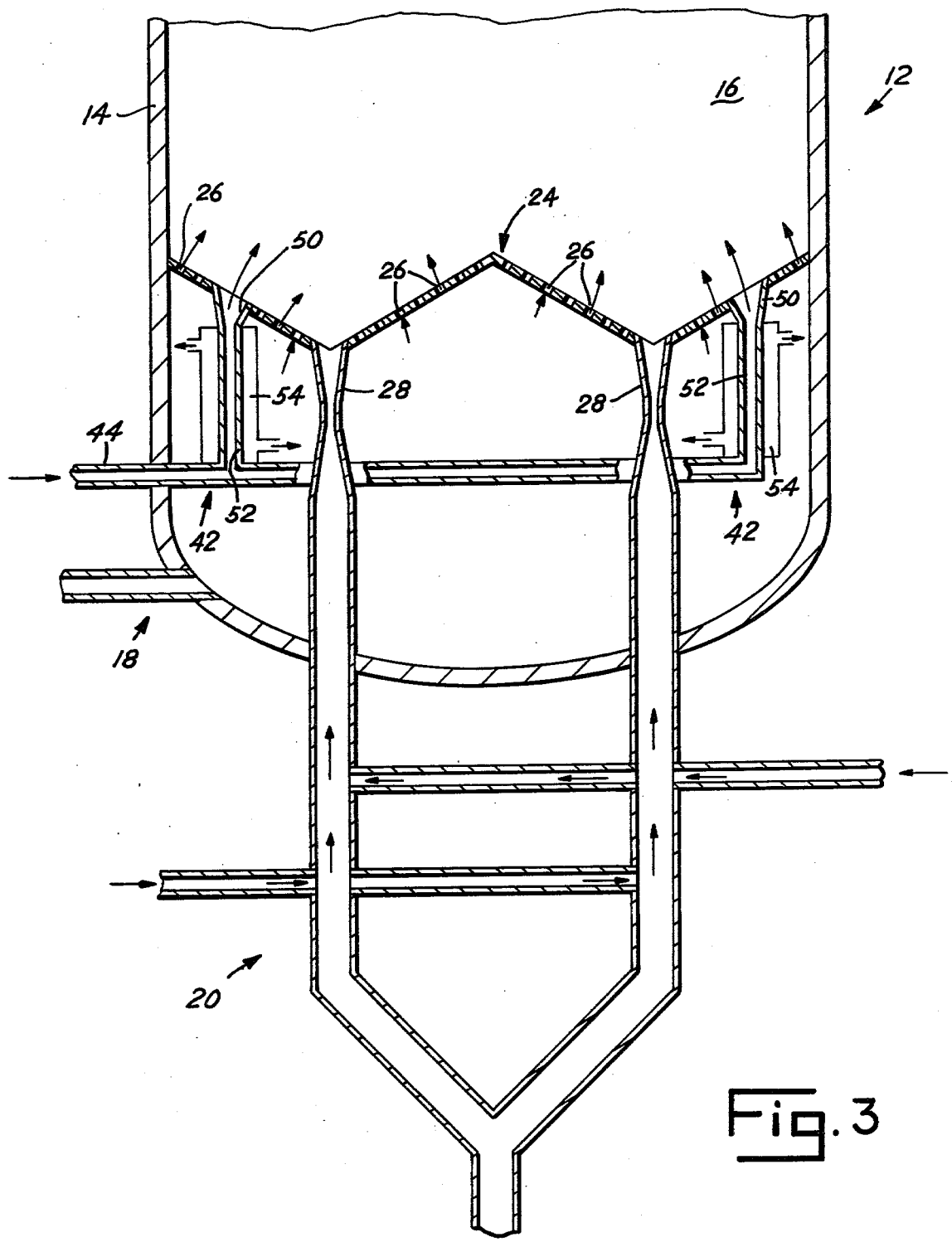
FIG. 3 is an enlarged cross-sectional view of the bottom portion of the gasifier shown in FIG. 1.

Referring now to FIGS. 1-3, the reactor 12 has positioned in the bottom, lower portion thereof a substantially horizontal gas distribution grid 24 to support the fluidized bed 16. Grid 24 is positioned substantially normal to the axis of the reactor. The fluidization and reactant gases, preferably steam and an oxygen-containing gas, such as air, enter reactor 12 through openings, selectively shown and designated as openings 26, in the gas distribution grid 24, via the gas injection system 18.

The ash withdrawal apparatus 20 includes a series of venturi-type throats 28, uniformly positioned on the gas distribution grid 24 in the center of the reactor to service equal cross-sectional areas of the reactor 12. The number of venturi-type throats 28 depends primarily upon the size of the reactor 12 and the coal being treated. The three-throat system illustrated is simply illustrative.

The gas distribution grid 24 slopes toward the venturi-type throats 28. As shown, each venturi-type throat 28 is associated with four sloping portions, selectively designated 30, of the gas distribution grid 24. Preferably, the gas distribution grid 24 defines substantially conical sections, tapered towards each venturi-type throat 28.

The ash withdrawal apparatus 20 is fully described in U.S. Pat. Nos. 2,906,608 and 3,935,825, the teachings of which are incorporated herein by reference. As disclosed therein, coal ash is separated from the fluidized bed 16 with a minimum of carbon loss and fluidizing gases enter the reactor 12 through the venturi-type throats 28.

The fuel gas withdrawal apparatus 22 includes a pair of cyclones 32A, 32B for withdrawal of the fuel gas from the reactor 12 and separation of finely divided coal and dust particles. The coal and dust particles are recycled to the fluidized bed 16 via the venturi-type throats 28 to recover the carbon value therein. This system in combination with the position of the coal inlets at the bottom of the fluidized bed provides efficient recovery of fines and obviates the need to specifically control the velocity of the incoming coal particles to minimize the loss of coal fines. The raw gaseous fuel is removed from the cyclone 32B via a conduit 34 for processing well known in the art.

The coal feed apparatus 17 includes a gaseous stream generator 38, a coal hopper 40 for receipt and pressurization of coal particles, and an inlet 42 to the reactor 12. The gaseous stream generator 38 produces a gaseous stream, having a predetermined high velocity, in a carrier vessel 44. Preferably, the predetermined high velocity is 50 to 300 feet per second. In this embodiment of the present invention, the gaseous stream contains steam and air or oxygen.

From the lock hopper 40, the coal particles are dropped through a valve 46 into the carrier vessel 44 and entrained in the gaseous stream to produce a gas particulate mixture. In the preferred embodiment shown in FIGS. 1-3, the gaseous stream in the carrier vessel 44 transports the coal particles to the inlet 42 for injection into the bottom of the fluidized bed 16 at the predetermined high velocity.

That is, the coal particles are admixed with the gaseous stream, preferably a steam-oxygen stream, and the resulting gas particulate mixture is pneumatically injected upwardly into the fluidized bed 16. Preferably, one to twenty pounds of coal are admixed per pound of gas in the stream. As shown in FIG. 2, there are two inlets 42 associated with each venturi-type throat 28 to provide six points of introduction of the coal particles into the bed around the inside perimeter of the reactor. The exact number of the introduction points around the inside of the reactor is a function of reactor diameter. In a typical commercial embodiment, at least three introduction points are provided.

Once injected, the carrier gases, i.e. steam and air or oxygen and the fresh coal, are distributed in the fluidized bed 16 without substantially altering the stability of or the residence time distribution of the bed and to become part of the total gasifying agent in the reactor 12. The quantity of oxygen in the carrier gas is limited, preferably 3 to 10 parts oxygen per 100 parts steam, to substantially avoid preignition of the coal particles in the vicinity of the gasifier 10. The small quantity of oxygen facilitates oxidation of the coal particles.

Referring again to FIG. 3, the inlet 42 includes a port 50 and a transport pipe 52, which communicates with the carrier vessel 44. The port 50 widens preferably conically in the direction of gas flow, such that inadvertent agglomeration of coal particles in the bed will not block the inlet 42.

To further avoid preheating and agglomeration, the coal feed apparatus 17 includes a water jacket for maintaining a sufficiently low coal particle temperature prior to entry into the reactor 12. As best shown in FIG. 3, the water jacket 54 substantially insulates the portion of the coal feed apparatus 17 within the wall 14, i.e. the transport pipe 52. The water jacket 54 substantially avoids premature heating due to conduction or radiation from the fluidized bed 16. The water jacket 54 preferably maintains the coal particle temperature below approximately 600° F.

The inlets 42 are positioned in close proximity to or near the reactor wall 14 and substantially away from the associated venturi-type throat 28 of the ash withdrawal apparatus 20 to facilitate mixing of the coal particles within the fluidized bed 16 without altering the stability of the bed and the residence time distribution of the coal in the bed. Preferably, the inlets 42 are spaced as far as possible from the throats 28. In this preferred embodiment, i.e. an ash agglomerating reactor 12, the solids in the fluidized bed 16 generally move downwardly along the reactor wall 14 and upwardly above the venturi-type throats 28. The flow or control between the fluidized bed 16 against the fresh coal feed results in rapid mixing thereof. This placement of the inlets 42 also substantially avoids interference with the operation of the ash withdrawal apparatus 20 by the injected gas particulate mixture.

Figure 4:
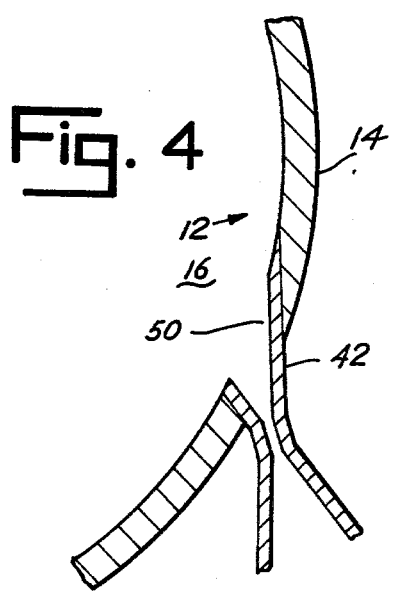
FIG. 4 is an enlarged partial cross-sectional view of the bottom portion of a fluidized bed reactor incorporating a second preferred embodiment of the present invention.

Referring to FIG. 4, a second preferred embodiment of the present invention is shown wherein the gas particulate mixture is injected through the reactor wall 14 substantially tangentially into the side of the fluidized bed 16 at the bottom thereof. As shown, the inlets 42 are preferably positioned substantially tangentially to the reactor wall 14 to provide a plane substantially normal to the axis of the reactor, such that the gas particulate mixture is injected along the interior surface thereof. The respective flow directions of the fluidized bed 16 and gas particlate mixture are, in this embodiment, substantially perpendicular to facilitate mixing thereof. Injection in this embodiment also occurs substantially away from the ash withdrawal apparatus 20 to avoid interference therewith.

Injection of coal particles in accordance with the present invention substantially avoids agglomeration and maintains the stability of the fluidized bed. Entering the fluidized bed 16 at the predetermined high velocity of 50 to 300 feet per second, the coal particles are shock heated to a temperature above the plastic temperature range. That is, the coal particles pass rapidly through the plastic, caking state to a charred, non-caking state. Further, the particles mix rapidly with the non-caking fluidized bed 16 and the resulting dilution separates the coal particles during the short transition period.

Heating the coal particles under the fluidized bed conditions of high temperature present in the bottom of the bed and a gaseous environment causes the release of volatile matter, including tars and oils. The rapid mixing of the fresh coal particles and charred material of the fluidized bed 16 maintains the volatile matter in the fluidized bed 16, such that thermal cracking occurs. That is, the tars and oils are reduced to carbon and low molecular weight gas, substantially eliminating the tars and oils from the gas effluent of the fluidized bed 16. For this reason, it is important that the coal be injected as close as possible to the bottom of the fluidized bed to maximize the production of fuel gas.

The shock heating of the coal particles also produces fines due to the explosion of the coal particles in a "popcorn" fashion. The fines are captured by the upper portion of the bed, and those particles which are carried out of the bed with product gas are captured by cyclones 32A, 32B and recycled to the fluidized bed 16 through the venturi-type throats 28. There the fines are rapidly gasified, adhering to the denser ash agglomerates which are withdrawn by the ash withdrawal apparatus 20.

Preferred embodiments of the present invention have been disclosed and described herein. It is to be understood, however, that various changes and modifications can be made without departing from the true scope and spirit of the invention, as set forth and defined in the following claims.

What is claimed is:

1. In a process for converting caking carbonaceous particles into a fuel gas utilizing an elongated reactor having a reactor wall and an axis therethrough, a fluidized bed in the bottom portion thereof maintained at conditions to convert said carbonaceous particles to fuel gas and means for withdrawing ash from the center, bottom portion of said reactor, the improved method of adding said carbonaceous particles to said fluidized bed which comprises:

introducing a high velocity gas stream having a velocity of 50 to 300 feet per second in admixture with said carbonaceous particles directly into the bottom of said fluidizied bed without prior pretreatment of the carbonaceous particles at a plurality of equally spaced-apart points around the perimeter of the reactor; said fluidized bed operating at a temperature within the range of about 1800°–2000° F., said gas stream being introduced into said bed at a predetermined high velocity at a location in close proximity to the reactor wall and a substantial distance away from said centrally located withdrawal means, whereby said carbonaceous particles are rapidly mixed with and shock heated by contact with the fluidized bed, said high velocity gas stream and admixed carbonaceous particles being passed substantially directly upward directly into the bottom of said fluidized bed in a direction substantially parallel to the axis of the reactor without substantially altering the stability of the fluidized bed and the residence time distribution of the carbonaceous particles in the bed.

2. The improved method of claim 1 wherein said high velocity gas stream in admixture with said carbonaceous particles is introduced into said bed in at least three spaced-apart points.

3. The improved method of claim 1 wherein said carbonaceous particles comprise pulverized coal.

* * * * *